(12) United States Patent
Board

(10) Patent No.: US 7,698,942 B2
(45) Date of Patent: Apr. 20, 2010

(54) TURBINE ENGINE STALL WARNING SYSTEM

(75) Inventor: David B Board, Boca Raton, FL (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 374 days.

(21) Appl. No.: 11/744,558

(22) Filed: May 4, 2007

(65) Prior Publication Data
US 2007/0261492 A1 Nov. 15, 2007

Related U.S. Application Data

(60) Provisional application No. 60/747,097, filed on May 12, 2006, provisional application No. 60/747,423, filed on May 17, 2006.

(51) Int. Cl.
*G01N 29/14* (2006.01)

(52) U.S. Cl. .............................. 73/587; 73/577; 73/579; 73/788

(58) Field of Classification Search .................. 73/587, 73/579, 583, 801, 802, 577, 788; 340/870.16
See application file for complete search history.

(56) References Cited

U.S. PATENT DOCUMENTS

| | | | |
|---|---|---|---|
| 3,554,012 A | 1/1971 | Schoel | |
| 3,842,663 A | 10/1974 | Harting et al. | |
| 4,083,235 A * | 4/1978 | Gallant | 73/112.06 |
| 4,530,240 A | 7/1985 | Board et al. | |
| 5,852,793 A | 12/1998 | Board et al. | |
| 6,014,896 A * | 1/2000 | Schoess | 73/583 |
| 6,076,405 A * | 6/2000 | Schoess | 73/587 |
| 6,192,759 B1 * | 2/2001 | Schoess | 73/583 |
| 6,212,944 B1 * | 4/2001 | Kwun et al. | 73/116.02 |
| 6,351,713 B1 | 2/2002 | Board et al. | |
| 6,499,350 B1 | 12/2002 | Board et al. | |
| 6,553,839 B2 | 4/2003 | Board | |
| 6,679,119 B2 | 1/2004 | Board | |
| 6,684,700 B1 | 2/2004 | Board | |
| 6,735,505 B2 * | 5/2004 | Levine | 701/35 |
| 2005/0005812 A1 | 1/2005 | Joos et al. | |

FOREIGN PATENT DOCUMENTS

| | | | |
|---|---|---|---|
| EP | 0997714 A2 * | 3/2000 | |
| GB | 2282297 A | 3/1995 | |
| WO | WO 96/07095 | * | 3/1996 |

OTHER PUBLICATIONS

International Search Report dated Jul. 18, 2008.

* cited by examiner

*Primary Examiner*—J M Saint Surin
(74) *Attorney, Agent, or Firm*—Pearne & Gordon LLP

(57) ABSTRACT

A Stall Warning System (SWS) utilizing the detection and analysis of stress waves, (i.e., ultrasound) emitted by combustion and/or turbulent flow processes of an apparatus, such as a turbine engine, for example. Upon detection of an impending stall condition, the SWS can inform the operator, inform another electronic device (computer, etc.) and/or latch the event for review by maintenance personnel.

16 Claims, 7 Drawing Sheets

Stall Test Sensor Locations

TURBINE ENGINE STALL WARNING SYSTEM

CROSS-REFERENCES TO RELATED APPLICATIONS

This application claims the benefit of provisional applications Ser. Nos. 60/747,097, filed on May 12, 2006, and 60/747,423, filed on May 17, 2006, both incorporated herein by reference.

FIELD OF THE INVENTION

The present invention relates generally to failure warning systems, and more particularly to a method and apparatus using stress waves to detect an impending stall condition in a device such as a turbine engine.

BACKGROUND OF THE INVENTION

The use of "stress waves" and their analysis is the topic of a number of patent applications, which will be briefly described hereinbelow:

U.S. Pat. No. 4,530,240, titled "Method and Apparatus for Diagnosing Machine Condition, and which is incorporated herein by reference, teaches a means for predicting machine failure by monitoring stress waves produced by friction and shock events.

U.S. Pat. No. 5,852,793, titled: METHOD AND APPARATUS FOR PREDICTIVE DIAGNOSIS OF MOVING MACHINE PARTS, and incorporated herein by reference, describes Stress Wave Analysis (SWAN) technology resulting from more than a decade of research and development activity. The technology includes analog and digital hardware designs, as well as software, that significantly increase signal to noise ratio, implement SWAN technology in low cost PC based platforms, and provide data logging and predictive maintenance capability. The disclosed method includes new ways of displaying SWAN data for simplified analysis, as well as Time Domain Feature Extraction software that provides "intelligent data compression" for use with Artificial Intelligence software.

U.S. Pat. No. 6,351,713, titled: DISTRIBUTED STRESS WAVE ANALYSIS SYSTEM, and incorporated herein by reference, discloses a next generation of SWAN products, which combine Stress Wave Analysis with Artificial Intelligence to provide automation to the interpretation of SWAN data. This improvement provides a further reduction in the skill levels and training required to use SWAN technology for accurate predictive maintenance, and extends SWAN capabilities for fault location/isolation and remaining useful life projection. A Frequency Domain Feature Extraction method and a proprietary Data Fusion Architecture are disclosed for providing very accurate fault detection, with very low probability of false alarms. The hardware designs described in this patent provide additional improvement of signal to noise ratio, while significantly reducing the size, weight, and power consumption of SWAN hardware, so that it becomes more practical for a variety of mobile and fixed base applications.

U.S. Pat. No. 6,499,350 titled: FOREIGN OBJECT DETECTION (FOD), and incorporated herein by reference, teaches the use of a specialized hardware implementation of SWAN technology for application to turbo machinery, which can be seriously damaged by the ingestion of foreign objects. The disclosed design is applicable for airborne, marine, and ground based applications.

U.S. Pat. No. 6,684,700 titled: STRESS WAVE SENSOR, incorporated herein by reference, defines functional performance requirements for a sensor specifically designed to detect stress waves. This reference also defines the quantitative relationships between the sensor specifications and the analog signal conditioning that is used to filter, amplify, and demodulate the sensor's broad band output.

U.S. Pat. No. 6,553,839 titled: METHOD FOR STIMULATING A SENSOR AND MEASURING THE SENSOR'S OUTPUT OVER A FREQUENCY RANGE and incorporated by reference, describes a calibration technique tailored to the peculiar functional specifications of certain stress wave sensors.

U.S. Pat. No. 6,679,119 titled: MULTI-FUNCTION SENSOR, and incorporated herein by reference, teaches that, for many predictive maintenance applications, SWAN and vibration analysis are complimentary technologies. The sensor described in this patent provides electrical signals proportional to both vibration and stress waves from a single device. This multi-function sensor significantly reduces cost, weight and power requirements compared to separate sensors. This device is applicable for both airborne and industrial applications.

Aerodynamic stall within the compressor and turbine sections of a gas turbine engine has always been a major concern of turbine engine manufactures and users. Aerodynamic stall can lead to sudden and complete loss of power, flameout, and unplanned shutdown, often with catastrophic consequences. Stalls can also cause undetectable High Cycle Fatigue (HCF) damage to the fan, compressor, and turbine blades in a turbine engine. This fatigue leaves a window for the damage to propagate into a catastrophic failure that would endanger lives and/or equipment.

Current attempts to provide stall warning are based upon applying thermodynamic modeling to temperature and pressure measurements made at various points in the engine gas path (Gas Path Analysis), but have been less than satisfactory.

Accordingly, the prior art, fails either alone or in combination with other references, to teach or suggest any apparatus or processes applied to detecting faults or stall conditions in aircraft engines. The prior art does not address, disclose or illustrate many of the components, software, functions or benefits of the instant turbine engine stall warning system, nor the hybrid functionality.

It would be useful to adapt various SWAN techniques to the problem of turbine engine stall problems.

SUMMARY OF THE INVENTION

Provided are a plurality of embodiments the invention, including, but not limited to:

A method for predicting an impending stall event for an apparatus, with the method comprising at least the steps of:
 monitoring stress waves generated by the apparatus during operation of the apparatus;
 processing the stress waves to generate derived values;
 comparing the derived values to a threshold value; and
 generating an impending stall signal based on the comparing.

Also provided is the above method where the step of monitoring stress waves includes at least the steps of providing a first sensor to monitor a first series of stress waves, and providing a second sensor to monitor a second set of stress waves, and wherein the step of processing the stress waves to generate derived values includes at least the steps of:
 processing the first series of stress waves to generate a first series of stress wave energy values, processing the second series of stress waves to generate a second series of stress wave energy values, and calculating a difference between the first series of stress wave energy values and the second series of stress wave energy values to generate the derived values.

Still further provided is a method for predicting an impending stall event for an apparatus, with the method comprising at least the steps of:

monitoring a first part of the apparatus to detect a first series of stress waves;

monitoring a second part of the apparatus to detect a second series of stress waves;

processing the first series of stress waves to generate a first series of stress wave energy values;

processing the second series of stress waves to generate a second series of stress wave energy values;

calculating a difference between the first series of stress wave energy values and the second series of stress wave energy values to generate energy difference values;

comparing the energy difference values to a threshold value;

comparing the first series of stress wave energy values to a normal operating value; and generating an impending stall signal when both of: the difference values cross the first threshold value and the first series of stress wave energy values are near the normal operating values.

Further provided is a system (such as a device, for example) for predicting an impending stall event for an apparatus, the system comprising: means for monitoring stress waves generated by the apparatus during operation of the apparatus; means for processing the stress waves to generate derived values; means for comparing the derived values to a threshold value; and means for generating an impending stall signal based on an output of the means for comparing.

Also provided is the above system wherein the means of monitoring stress waves includes a first sensor mounted on the apparatus at a first location to detect a first series of stress waves and a second sensor mounted on the apparatus at a second location to detect a second set of stress waves.

The above discussed system can also be provided where the means for processing the stress waves to generate derived values includes: means for processing the first series of stress waves to generate a first series of stress wave energy values, means for processing the second series of stress waves to generate a second series of stress wave energy values, and means for calculating a difference between the first series of stress wave energy values and the second series of stress wave energy values to generate the derived values.

Additionally provided is a system for predicting an impending stall event for an apparatus, the system comprising: means for monitoring a first part of the apparatus to detect a first series of stress waves; means for monitoring a second part of the apparatus to detect a second series of stress waves; means for processing the first series of stress waves to generate a first series of stress wave energy values; means for processing the second series of stress waves to generate a second series of stress wave energy values; means for calculating a difference between the first series of stress wave energy values and the second series of stress wave energy values to generate energy difference values; means for comparing the energy difference values to a threshold value; means for comparing the first series of stress wave energy values to a normal operating value; and means for generating an impending stall signal when both of: the difference values cross the first threshold value and the first series of stress wave energy values are near the normal operating values.

Still further provided is a system for predicting an impending stall event for an apparatus, the system comprising: a first sensor provided at a first location on the apparatus for monitoring a first series of stress waves for generating a first sensor output signal; a second sensor provided at a second location on the apparatus for monitoring a second series of stress waves for generating a second sensor output signal; a first electric assembly for receiving the first series of stress waves, the first electric assembly including a filter for filtering the first sensor output signal and also including a demodulator for demodulating the first sensor output signal to output a first pulse train; a second electric assembly for receiving the second series of stress waves, where the second electric assembly includes a filter for filtering the second sensor output signal and also includes a demodulator for demodulating the second sensor output signal to output a second pulse train; and a processor adapted for processing the first pulse train into a first series of stress wave energy values.

The processor of the above system can also be adapted for processing the second pulse train into a second series of stress wave energy values, wherein the processor utilizes the first series of stress wave energy values and the second series of stress wave energy values to generate derived values for comparing to a threshold value, the processor also adapted for determining whether the first series of stress wave energy values represent a normal operating condition.

The processor of the above system can be further adapted for generating an impending stall signal based on results of the comparing and the determining.

Also provided are additional embodiments of the invention, some, but not all of which, are described hereinbelow in more detail.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE PREFERRED EMBODIMENTS

Figure 1:
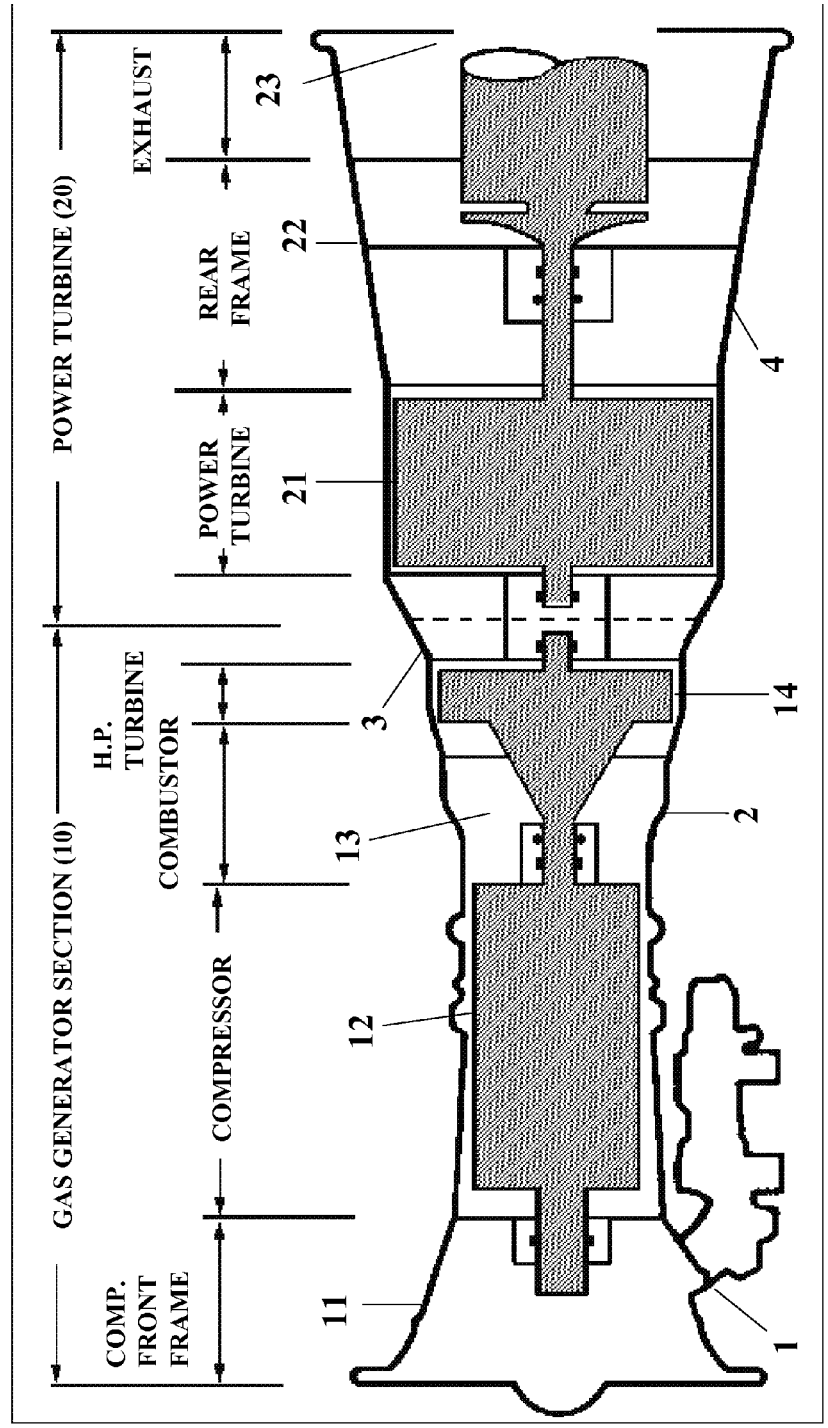
FIG. 1 is a diagrammatic representation of desirable stress wave sensor locations on an example turbine engine application.

It has been determined that the detection and analysis of stress waves obtained from a turbine engine can be used to provide advance warning that a stall event is impending. Testing shows that stress waves can be used to detect the onset of pre-stall aerodynamic effects, prior to loss of power.

Furthermore, stress wave analysis could similarly be utilized to examine a number of other stall or stall-like events, such as the stall that might result from a plane that files at too steep of an angle, causing airflow disturbances over the wing, or various other fluid flow processes, where turbulence might interfere with the flow of fluid due to certain operating conditions or device settings, for example. An example includes its use for Unmanned Aerospace Vehicles. An unmanned aircraft would not have a pilot, who could feel vehicle vibrations from an impending stall, and an array of on-wing pressure sensors may not be able to survive the temperatures of atmospheric re-entry, while stress wave sensors located on internal wing structures could detect an impending stall in both cases. Another example includes its use for detection of cavitation in pumps, where the changes in stress waves due to turbulence and liquid-gas phase changes can be measured by stress wave sensors mounted on the suction and discharge sides of the pump.

The basic principle underlying this analysis is that variations in the energy content of stress waves occurs just prior to stall on one side of the flow versus the other side of the flow, as compared to the normal operating condition. For example, in a turbine engine, proper combustion causes the stress waves monitored downstream of the combustion chamber to have more energy than stress waves found upstream of the combustion chamber, but this difference begins to disappear when the combustion process is interfered with, such as by stall induced dynamic changes in the compressible fluid flow through the engine. By monitoring this energy, an impending stall event can be detected and mitigated. Similar results can be obtained by monitoring fluid flow in other situations where turbulence in the flow causes an energy differential to be detectable. Thus, a stall event is one where dynamic changes in the fluid flow (such as via turbulent flow and/or inefficiencies in a combustion process) cause an adverse impact on the operation of the monitored device.

The SWAN techniques discussed herein (and in the prior art patents discussed above) can be used to detect and measure sounds in the ultrasonic frequency range. This type of sound is generated by high speed compressible fluid flow and combustion in a gas turbine. When a stall develops in a device such as a gas turbine engine, the airflow through the engine is aerodynamically restricted, and effectively "choked". This choked flow is unstable. It can have a variable or "pulsating" flow rate and abnormal amounts of turbulence at various points in the engine. These aerodynamic instabilities result in inefficient combustion due to localized and dynamic variations in the fuel/air mixture, and, in extreme cases, aerodynamic stall in the High Pressure turbine.

Due to the inefficient combustion preceding a stall event, the time waveform characteristics of ultrasonic Stress Wave Pulse Train, downstream of the combustor section of the engine, are changed, and its energy content is reduced, during the dynamic processes leading up to a "stall".

A SWAN-based stall indicator or a turbine engine would work by employing two or more sensors; sensor 1 mounted to pick up stress waves at the exit of the compressor, and sensor 2 mounted to pick up stress waves at the exit of the High Pressure Turbine, in the gas generator section of the engine. A digital processor (possibly the same one used for the engine control system) simultaneously processes signals from these two sensors, and computes the SWE at each location.

The advance warning of an impending stall provided by the disclosed method and monitoring apparatus can provide the operator with enough time to make control corrections that will prevent the stall from occurring. This is due to the fact that the energy of the stress waves is a function of combustion efficiency and aerodynamic turbulence in the combustor and gas generator turbine sections of the engine. The stress wave signal can therefore be processed through analog or digital means to detect the impending stall event, as discussed herein.

The inventor has successfully demonstrated that stress waves can be used to detect impending stall in a turbine engine, and thus a Stall Warning System (SWS) as disclosed herein can be utilized to predict and warn of such impending stall. Such an SWS analyzes the stress waves provided by a monitored device or system to determine that a stall event is imminent, but with sufficient warning time to take preventive measures.

An example SWS described herein applied to a turbine engine is shown in FIG. 1. The example system is comprised of a plurality of stress wave sensors 1, 2, 3, and 4, mounted on the engine 5 at external locations that provide a good acoustic transmission path from the core bearing housings. The system is interfaced using a cable to connect the sensors with an electronics assembly, such as the one shown in FIG. 2.

Figure 2:
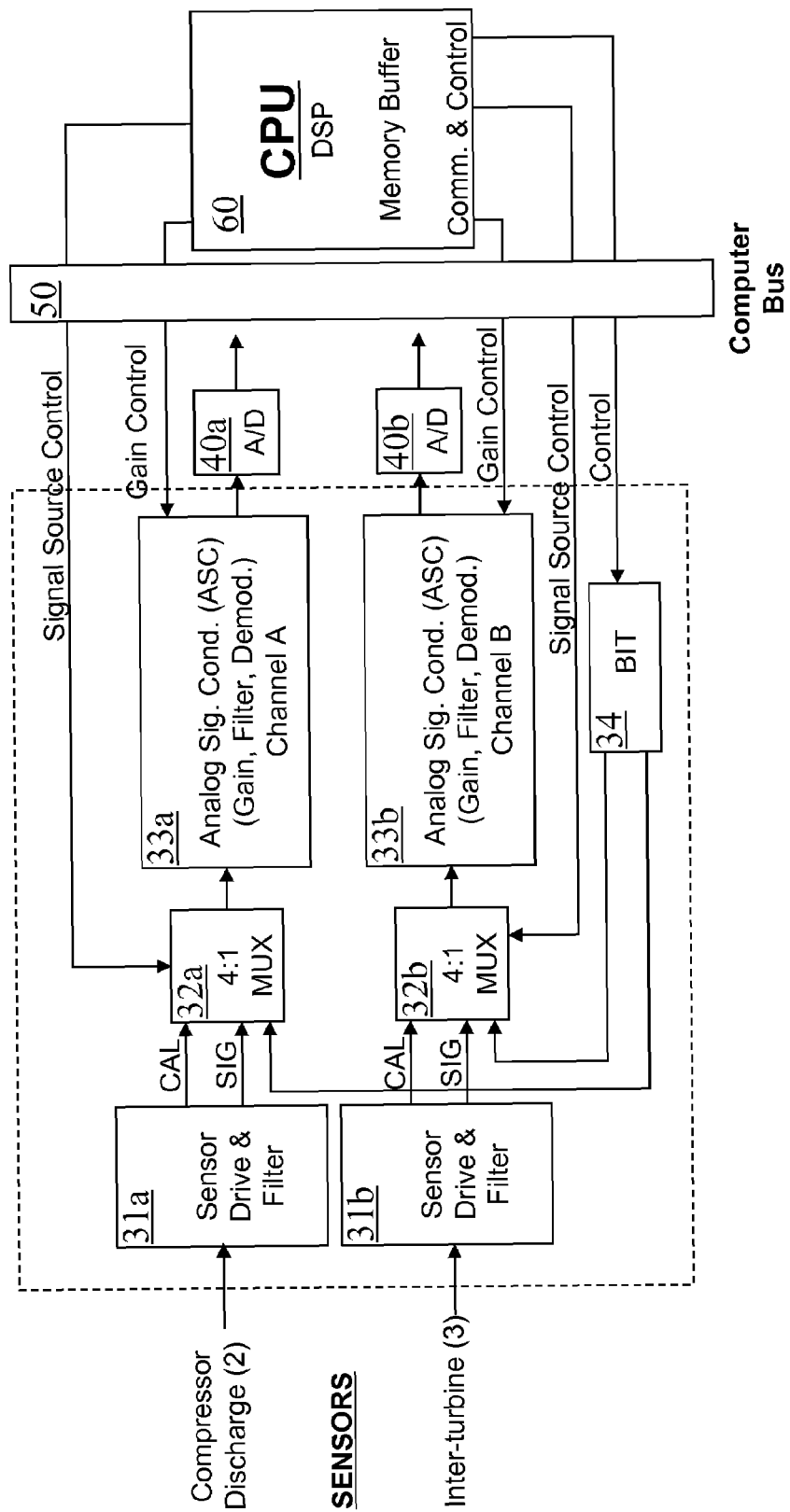
FIG. 2 is a schematic representation of a functional block diagram illustrating components of an example embodiment of a device according to the invention.

The Examiner example assembly shown in FIG. 2 only utilizes two of the four sensors, but could easily be adapted to handle all four, if desired, or a second assembly utilized to handle the additional two sensors. The assembly of FIG. 2 utilizes the compressor discharge sensor 2 and the inter-turbine sensor 3 for stall detection, and thus sensors 1 and 4 could be eliminated in some embodiments, if desired. For the example application, one sensor used for the analysis should be placed "upstream" of the combustor and gas generator turbine, whereas another sensor is placed "downstream" of the gas generator turbine.

Depending on engine design and structure available to conduct stress waves, the type of gas turbine (turbo-fan vs. turbo-shaft), and the operating environment (airborne vs. ground based), different combinations of stress wave sensors may be utilized to obtain the best measure of an impending stall. Also the actual number and location of the sensors will be a function of the engine model, and whether or not the engine is also being monitored for bearing condition and Foreign or Domestic Object Damage (FOD or DOD), as described in U.S. Pat. No. 6,499,350.

The electronic assembly of FIG. 2 is used to signal condition, demodulate, and process the stress wave signal obtained by sensors 2 and 3 to determine/notify if a stall event is pending. This solution overcomes the challenges of detecting a low energy event in an extremely high energy environment, without the need of a highly trained professional to analyze data, and gives a real-time or near real-time indication that a stall event is imminent. Turbine engine systems can thus be made safer and more reliable when using this solution.

To provide a stall warning indication, typically at least 2 of the sensors shown in the example of FIG. 1 are needed for this process (for this example, sensors 2, 3 are used in the example). Each sensor of the example will use a dedicated Signal Conditioner 33a, 33b, as shown in FIG. 2, so that data from both sensors can be acquired continuously, and analyzed synchronously.

If SWAN is also to be used for monitoring the status of the bearings and gears of the engine (in addition to stall indication), then the additional sensors 1, 4 can be utilized, and a multiplexer can be provided at the input to each signal conditioner for temporarily selecting a different sensor as its input. In that case, the 2 additional sensor inputs 1, 4 can be devoted to monitoring bearings and gears in other sections of the engine and/or any accessory gearbox. Such a system might require less than a 2-3 second "diversion" from the 2 sensors that are employed for Stall Warning, in order to collect data from the additional 2 sensors. Because this "diagnostic diversion" is very short, compared to the advance warning provided by the Stall Warning Indicator, the Stall Warning capability would be unaffected. For an engine that uses SWAN for stall warning only, there would be no need for any 2-3 second diversion.

This application is suitable for many gas turbine applications which can benefit from the early detection of an impending stall, including use on the detection of impending stall events within aircraft turboshaft and turbofan engines, in addition to turbine engines that are utilized by ocean-going vessels, power generation, and other applications. Other rotating machines that are subject to stall events, or stall-like events that are similar to turbine stalls (such as where turbulent gas flow might choke-off the flow of a gas, for example) could also utilize this application in a similar manner.

The example application utilizes at least one stress wave sensor and an electronic assembly to process the stress wave signal, such as those disclosed in one or more of the patents discussed in the background section, for example. For example, a sensor that utilizes resonant amplification and band-pass or high-pass filtering of the signal at the sensing element can be used. A non-resonant ultrasonic sensor could also be used for this application, but would preferably utilize greater signal amplification and have a lower sensitivity to low frequency sound than a resonant sensor.

The use of a specialized sensor for detection of stress waves can provide a significant advantage for the disclosed application. The stress wave frequency of interest typically ranges from 20 kHz up, but typically less than 100 kHz, although larger frequencies may be utilized as well, if desired. To reduce the sensor's output signal amplitude range, and the associated dynamic range requirements of the signal conditioning electronics, the sensor may incorporate two useful features: resonant gain and high pass or band pass filtering. For the testing referenced herein, the resonant frequency of the sensor was chosen to be about 38 kHz, and the sensor had a resonant gain of at least 30 dB referenced to the maximum sensitivity at all frequencies below 10 kHz, and band pass filtration was centered at 38 kHz. This provided good results.

Even with the resonant amplification at the sensor, the signal may need additional amplification, which can be provided by the electronic assembly. This amount of amplification needed is a function of the type and power output of the engine being tested. Therefore, one or more amplifiers may be needed in the electronic assembly. In addition, based on losses introduced by the optional series of filter stages, there may need to be amplification of the filtered signal prior to passing it onto the next stage.

Another useful component of typical SWS design is to provide filtering, such as band pass filtering in the above example embodiment, although high-pass filtering might also be used. In a typical turbine engine, combustion and turbulent flow generate acoustic noise over a broad band of frequencies. Low frequency signals tend to be a high percentage of the overall signal, relative to the higher (stress wave) frequencies of interest for this disclosed application. Employing a stress wave sensor(s), with a resonance that provides selective amplification at 38 kHz, for example, helps to focus on the signals of interest. To further separate the frequency of interest from the background (noise) signal, a band pass filter designed around the sensor's resonant frequency can also be used. The desired bandwidth can vary depending on the chosen sensor and the type of engine being monitored. The stall test was conducted with a 14 kHz pass band.

Depending on the stress wave signal strength of the chosen sensor in a given application, an amplifier may be utilized in-between a band pass filter and a demodulator to ensure optimum performance. Thus, the signal conditioning circuits 33a, 33b of FIG. 2 might be implemented by the example circuit of FIG. 3, where an example design of a signal conditioning circuit is shown.

At the final stage of the signal conditioning, amplitude demodulation is performed. The resulting demodulated signal output is referred to as the stress wave pulse train (SWPT), and the area under the resulting curve is referred to as the stress wave energy (SWE).

The SWPT can be processed by either analog or digital means to detect the SWE created by the shaft bearings, the combustion process, and turbulent flow within the engine. This is basically done by integrating the SWPT. In the Example embodiment of FIG. 2, a pair of A/D converters 40a, 40b convert the SWPT to a digital signal, where it is transferred via a computer bus 50 to a CPU 60, where this integration can occur. Additional processing of the integrated signal can also be performed in the CPU 60.

FIG. 1 shows the locations of 4 stress wave sensors 1, 2, 3, and 4 that can be employed during a Stall Test on a medium sized turbo-shaft engine. A stall was induced by opening the engine's Variable Stator Vanes (VSV's) and "choking" flow through the combustor and High Pressure (HP) turbine. Note that, as described above, sensors 2 and 3 are utilized for the purposes of predicting an impending stall.

The ASC gains are set, for example so that the SWE from sensor 3 is greater than the SWE from sensor 2, under a full range of normal operating conditions (with healthy bearings). The Delta SWE is then calculated as (sensor 3 SWE−sensor 2 SWE), at the same point in time. Each Delta SWE value is compared to a Stall Warning Threshold (e.g., by the CPU). If the Delta SWE value is less than the Stall Warning Limit Threshold, a stall event may be imminent.

In addition, to further improve the ability to separate a stall event from other events, such as normal wear-and-tear on the components or an impending component failure, the compressor discharge SWE (from sensor 2) can be examined to see if it is found to be within normal operating limits. If the Delta SWE has crossed the threshold, and the compressor discharge SWE is within normal parameters, then it is likely that the change in Delta SWE is due to an impending stall condition, and the CPU can generate a stall signal (e.g., a status flag). This stall signal indicates that an imminent stall condition exists, and can be used to issue a stall warning (for example, to an operator of the apparatus being monitored), or to automatically take mitigating actions (such as modifying the operating parameters to prevent the stall from occurring).

Figure 6:
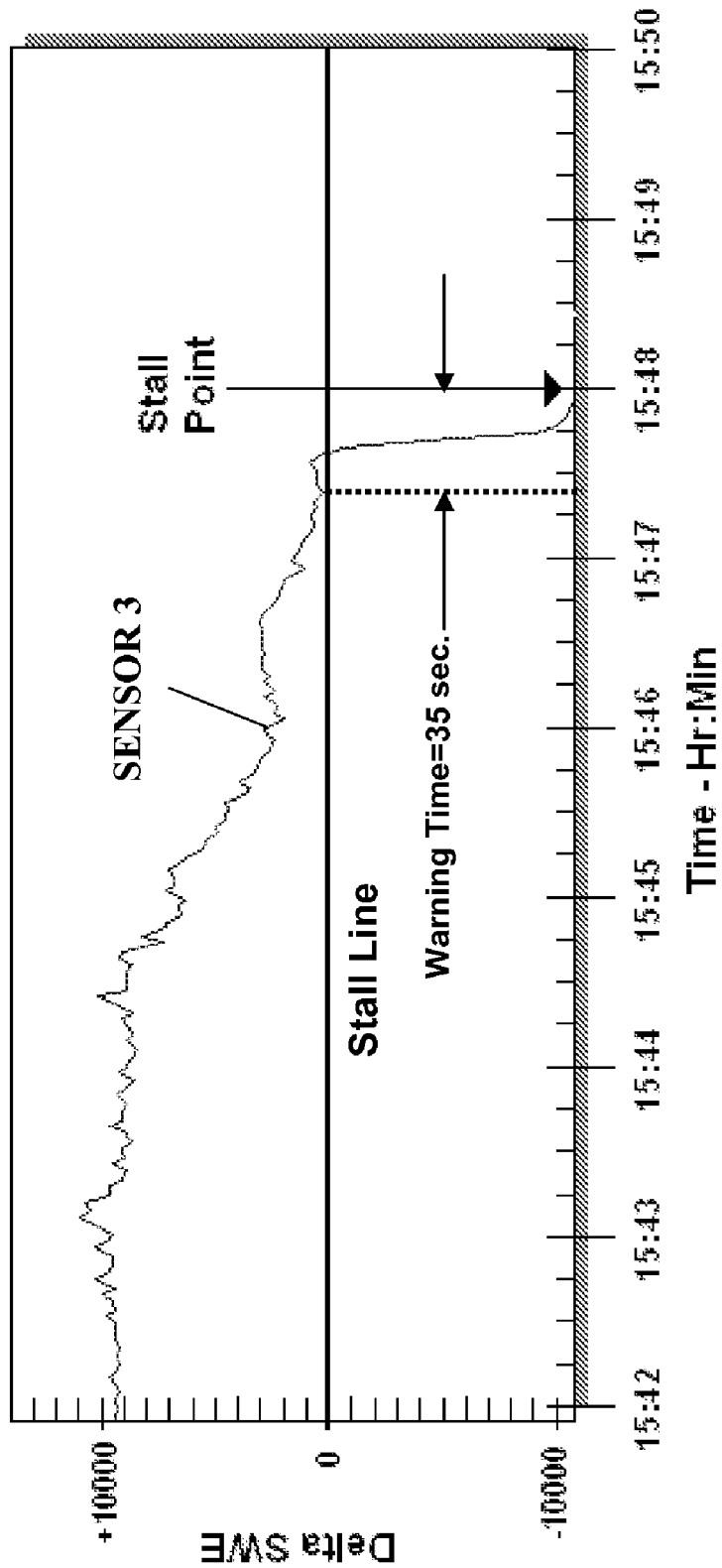
FIG. 6 is a graphical representation of Delta SWE stall indicator at a first threshold using the example embodiment.
Figure 7:
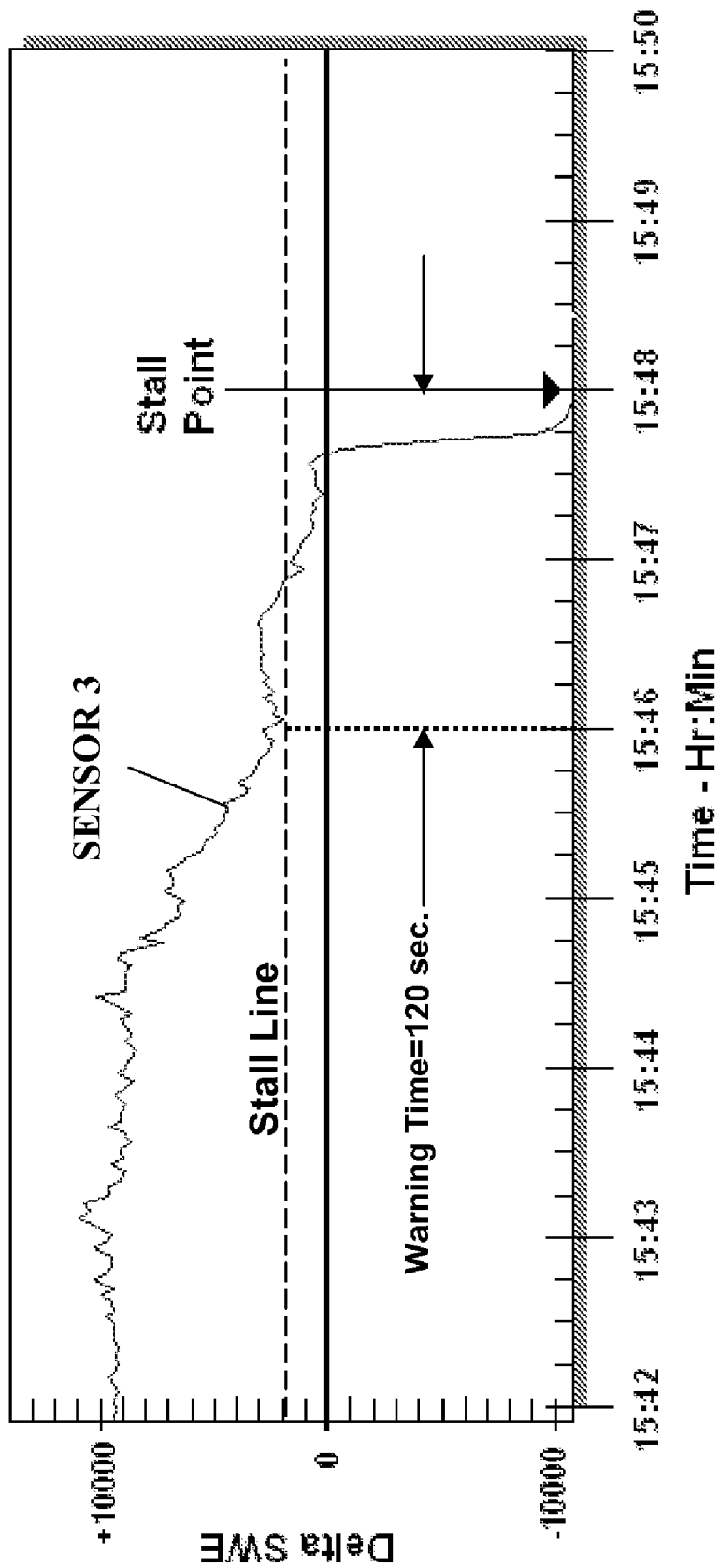
FIG. 7 is a graphical representation of Delta SWE stall indicator at a second threshold using the example embodiment.

As shown in FIGS. 6 and 7, the stall warning threshold can be adjusted to provide more, or less, advance notification, as desired. Depending on the range of SWE readings that may occur under normal operating conditions, more advance notification may result in a higher probability of false warnings. Conversely, adjusting the stall warning threshold for less advance warning, may reduce the probability of a false warning, but at the cost of increasing the probability of not detecting a stall before it is too late to take corrective action.

Conditions that may increase the range SWE readings (necessitating adjustment of the stall warning threshold) include sources of friction and micro-shock, such as contaminated lubricant, bearing damage, and compressor blade rub. One way to narrow the range of normally expected SWE readings that may be expected to occur under normal operating conditions, is to define a different range of expected SWE values as a function of High Pressure (HP) Turbine RPM. This results in the ability to provide both advance warning and high accuracy. In this case, a stall warning would be provided only when the Delta SWE has crossed the threshold limit and when the compressor discharge SWE is within normal operating limits as a function of HP turbine RPM.

Figure 4:
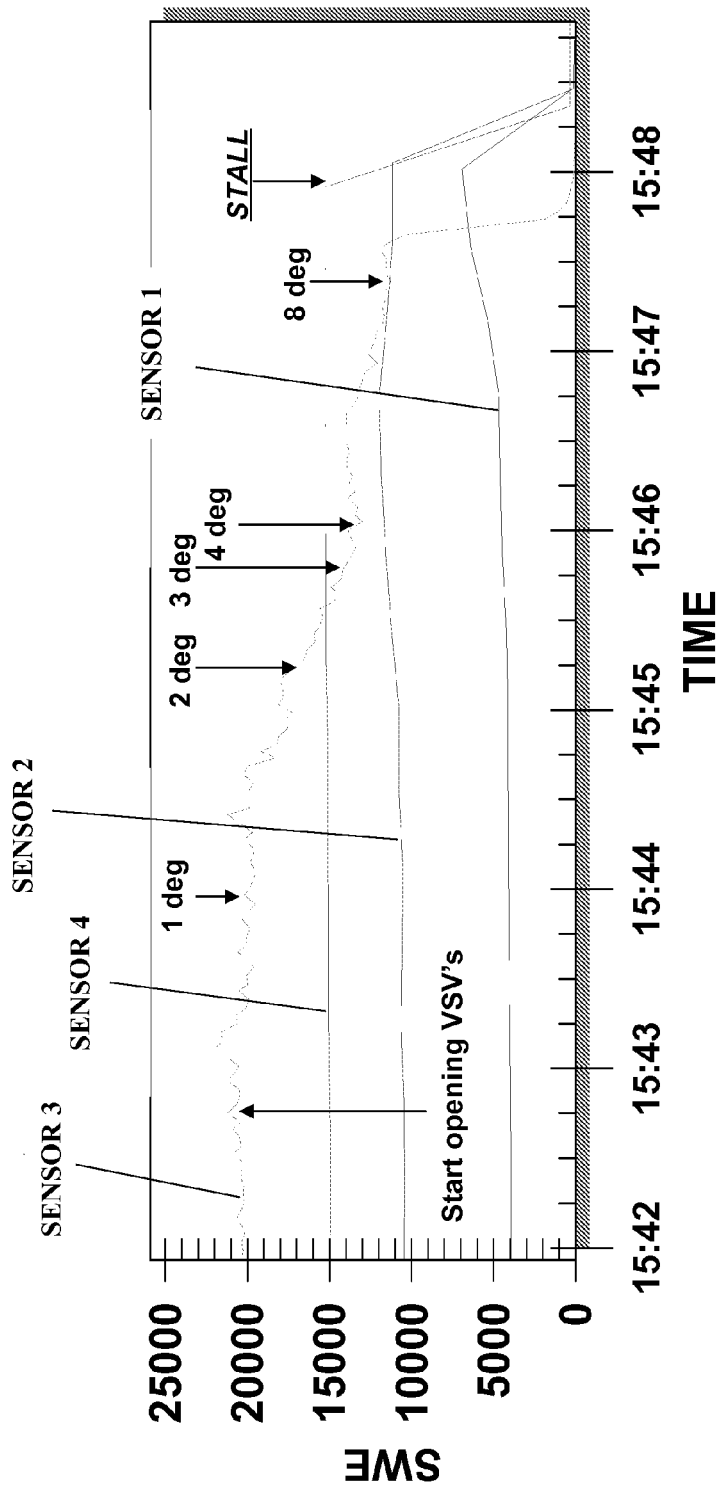
FIG. 4 is a graphical representation of stress wave energy trends during stall tests of the example embodiment.

Back to the example embodiment, FIG. 4 shows the corresponding trends of SWE data from all 4 sensors during a six minute period (an 8 degree VSV change) leading up to a stall at the shown point. The SWE is a computed feature of the Stress Wave Pulse Train (SWPT) which is extracted from the sensor's broadband output by the filtering and demodulation signal conditioning (see, e.g., U.S. Pat. No. 6,351,713 incorporated herein by reference). This figure clearly shows that SWE values at the inter-turbine sensor 3 located between the 2 turbines drops significantly, relative to all three other sensors, starting 3-4 minutes prior to the actual stall event (2-3 degrees of VSV angle). The signal from the inter-turbine sensor 3 appears more aerodynamically driven than the SWE at the other sensor locations 1, 2, and 4, which are instead primarily a function of the shaft/bearing load and speed parameters. Accordingly, a good indication of an impending stall is a change in the difference between the SWE at the inter-turbine sensor 3 and a reference sensor (e.g., any one of 1, 2, and 4), whose SWE is driven by shaft/bearing load and speed. This difference between SWE measurements from 2 sensor locations on the same machine is called the Delta Function. An example such Delta Function between sensor 3 and another sensor is plotted in FIG. 5.

Figure 5:
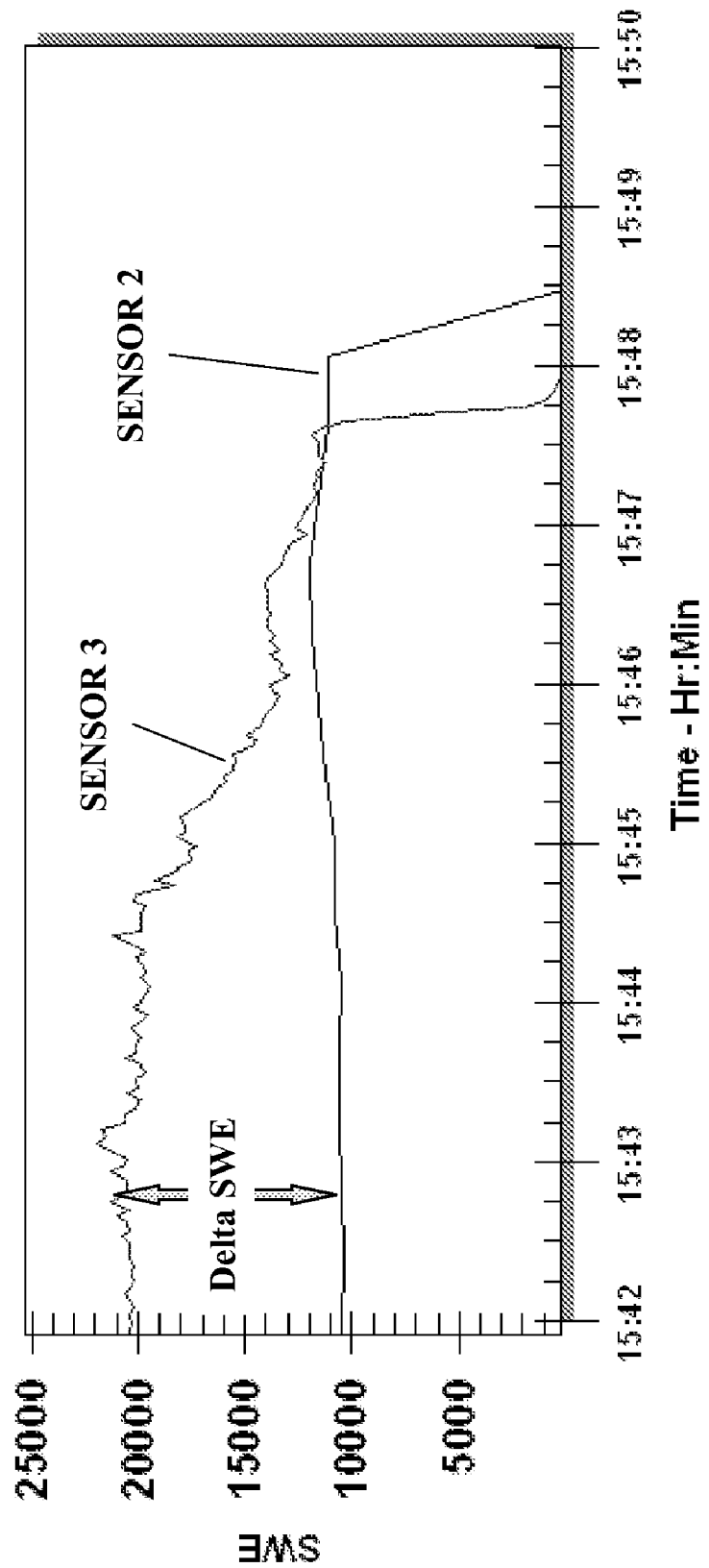
FIG. 5 is a graphical representation showing a Delta SWE (stress wave energy) of the example embodiment.

From FIG. 5 it is apparent that the Delta Function between the compressor discharge sensor 2 and the inter-turbine sensor 3 decreases dramatically about 2 minutes (4 VSV degrees) before the stall. Furthermore, when the (compressor discharge—inter-turbine) Delta Function drops to 0 (or, alternatively, a negative value soon thereafter) the engine stall is imminent. FIGS. 6 and 7 illustrate how different amounts of advance warning time can be implemented by setting the Delta SWE warning threshold at different values. Accordingly, stall warnings can be provided with ample time to take corrective action, such as shutting the engine down or changing operating parameters to avoid the stall. The Delta SWE and its application is described in more detail in the priority document Ser. No. 60/747,423, filed on May 17, 2006, which is incorporated herein by reference.

As discussed above, FIG. 2 is a functional block diagram of an example Stall Warning Indicator system for a turbine engine of the type in the Demonstration Test, with a channel for each sensor. The following is a brief functional description of each block in the diagram.

The Sensor Drive & Filter 31*a*, 31*b* supply constant current power at 24 VDC for supporting the sensors (not shown). A High temperature, coaxial, capacitance controlled, cable is connected to each sensor 2, 3 (note that, as described above, this device does not utilize sensors 1, 4, but could be adapted to do so). The sensor Signal "rides" on the power conductor. The Sensor Drive & Filter 31*a*, 31*b* also has a High Pass Filter (HPF) to attenuate low frequency noise.

Two 4:1 Multiplexers (MUX) 32*a*, 32*b* are also provided, one MUX for each channel of Analog Signal Conditioning. One input to each MUX is dedicated to select a Built-In Test (BIT) signal, one input to each MUX is dedicated to select a calibration signal from the corresponding component 31*a*, 31*b*, and two inputs to each MUX are available for stress wave sensor inputs from component 31*a*, 31*b*. Both MUX's are controlled by the CPU 60.

Note that, as discussed above, additional sensors (in addition to the pair 2, 3 shown in FIG. 1 used for computing the Delta SWE Stall Warning Indicator) can be devoted to monitoring bearings and gears in other sections of the engine and it's Accessory Gearbox. Such a system would likely require less than a 2-3 second "diversion" from the two stall sensors in order to collect data from the additional sensors. Since this "diagnostic diversion" is very short, compared to the advance warning provided by the SWS, the Stall Warning capability would be unaffected. The data from the additional sensors along the engine core that are used for the SWS, can also provide Foreign Object Detection (see U.S. Pat. No. 6,499, 350, incorporated herein by reference). The data from all sensor locations can be utilized for bearing, gear, and lubrication efficiency monitoring (See Patent Nos. 5,852,793 and 6,351,713, both incorporated herein by reference).

Figure 3:
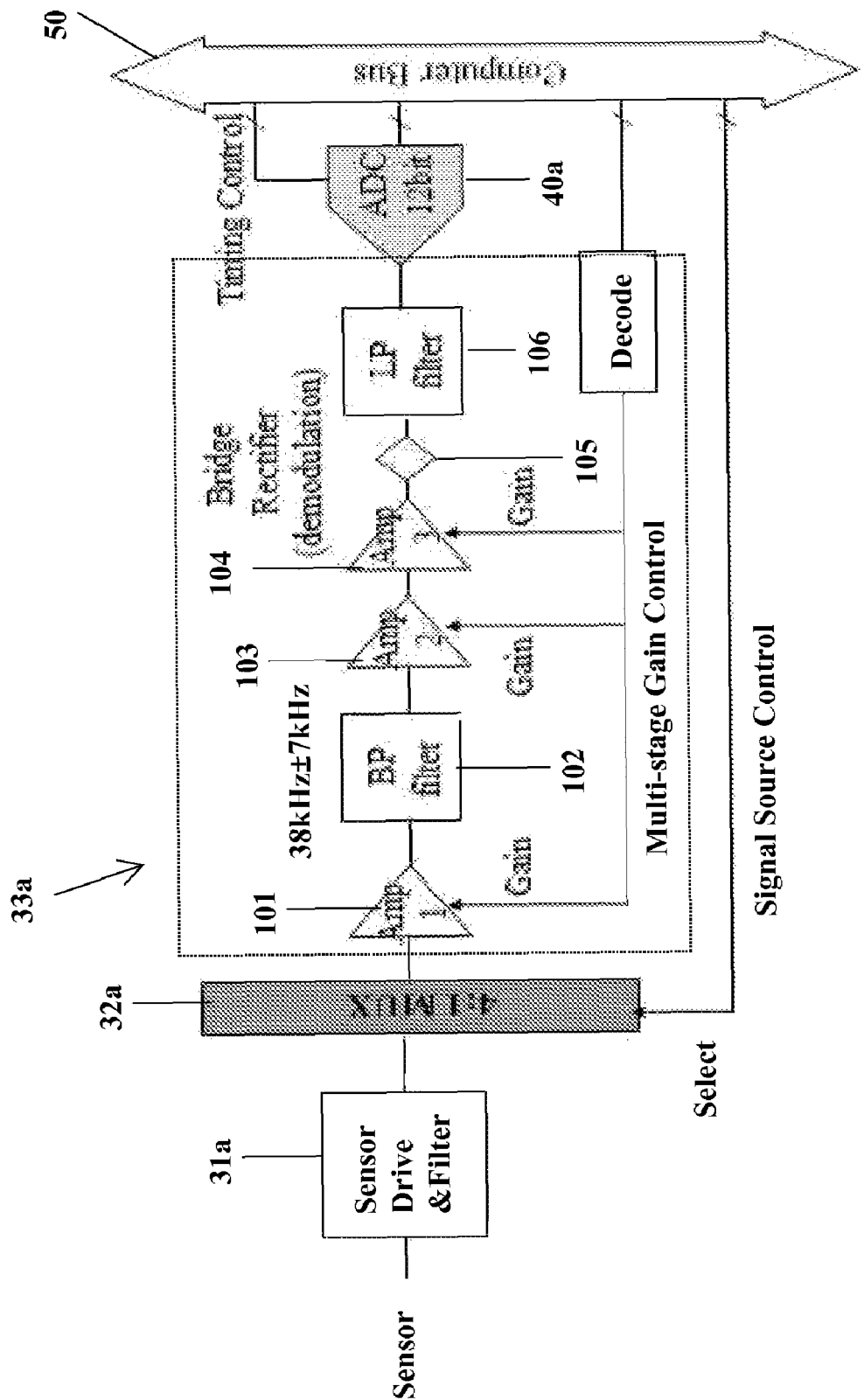
FIG. 3 is a schematic showing some of the components of FIG. 2 in more detail.

A pair of Analog Signal Conditioners (ASC) 33*a*, 33*b* are provided, and are shown in more detail in FIG. 3. The ASC functions include Gain, Band Pass Filtering (BPF), and Demodulation. The Gain, provided by amplifier 101, is controlled by the CPU, and set as a function of sensor location. Gain settings are generic for the fleet. The BPF 102 preferably has a broad, flat, pass band, and steep skirts, to filter everything except the stress wave carrier frequency (the sensor resonance) out of the broad band signal. The Demodulator includes a Full Wave Rectifier 105 and Low Pass Filter (LPF) 106 to detect the amplitude modulations of the stress wave carrier frequency (the Stress Wave Pulse Train (SWPT)). Note the optional additional amplifiers 103, 104, which can provide additional gain and may also be controlled by the CPU 60.

The above components (not including the sensors) could be integrated into a single-side, surface mount multilayer board of about 15 square inches for ease of installation and placement.

A pair of Analog to Digital (A/D) Converters 40*a*, 40*b* receive the respective outputs of the conditioning circuits 33*a*, 33*b*. The A/D converters 40*a*, 40*b* simultaneously sample the SWPT from each channel, so that Digital Records (DRs) from both ASC channels cover the same period of time. The A/D resolution of the example embodiment is 12 bits.

The Demodulator section of the ASC can provide an inherent anti-aliasing filter (The Demodulator LPF corner frequency=7 KHz, for example). The sampling rate for the Stress Wave Pulse Train (SWPT) from each ASC of the example embodiment is about 20 KHz.

A Built In Test (BIT) Signal Generator 34 is also provided. The BIT 34 represents a good amount of circuitry whose purpose is to generate a simulated signal that can be injected into the system for the purpose of performing a self test and system calibration. Internal to the BIT (Built-In Test) is a digital to analog (D/A) converter that makes the digitized signal created within the BIT into an analog waveform. A 32-bit D/A could be provided in the BIT 24 to provide an extremely fine resolution in the ability to control the simulated waveform. However, because it is rare to find such D/A converters in greater than 18-bit resolutions, such a version would be acceptable. In the BIT 34, the digital waveform file is converted to a standardized broadband analog signal by the BIT 34 Digital to Analog (D/A) Converters. The broadband analog signal is selected as an input by the MUX for the ASC channel. Time Domain features are calculated and compared to expected values to determine Pass vs. Fail status. As discussed above, the D/A converter could have a 32 bit resolution to accurately simulate low amplitude, high frequency stress waves, riding on a high amplitude, low frequency vibration signature.

A Central Processing Unit (CPU) 60 is provided to process the resulting output of the A/D converters 40*a*, 40*b*. This CPU could be implemented using a general or dedicated purpose controller or microprocessor, for example, which would execute software routines stored in memory to implement its desired functions. The CPU 60 executes Control, Communications, and Digital Signal Processing (DSP) functions. Control functions include MUX selection of appropriate sensor, calibration, or Built In Test (BIT) inputs, initiating BIT signal inputs, initiating digital recordings, and setting ASC gains. DSP functions include execution of all software objects necessary to implement the Data Fusion Architecture (DFA) (see, e.g., U.S. Pat. No. 6,351,713). Communication functions include recognizing Engine Control Computer (ECC) requests to take data at reference operating conditions, and communicating DFA results to the ECC. These computer functions could be performed by the same ECC that operates the engine's fuel control, or by a dedicated SWAN computer, for example. Alternatively, the CPU might be located remotely from the apparatus being monitored, and it might even receive the input data via an Ethernet LAN, for example, or perhaps even via the Internet should response times prove adequate for a given need.

The above implementation can also take advantage of the benefits of neural networks for providing much, or all, of the computation functions.

An alternative implementation would compare the Stress Wave Energy at the exit of the High Pressure Turbine, as discussed above, to a range of expected values as a function of the engines operating condition, as measured by a Gas Path Analysis thermodynamic model.

Other features of the Stress Wave Pulse Train (SWPT) may also be good indicators of an impending stall. These features would include, but not be limited to, the Probability Density Function of stress wave peak durations, amplitudes, and peak energies (note that peak energies are NOT the same as the total SWE). These other features, to some extent, are described in the cited references (e.g., U.S. Pat. No. 6,351,713, incorporated by reference).

It should also be noted that sensor placement is a function of the structural (acoustic) path from the area in the engine where stall effects are manifested as changes in the stress waves. Thus for different engine designs, the optimum sensor location may not be as shown in the illustrative example. Also, if the objective is to detect early signs of compressor stall, then a sensor on the compressor case would provide the best indication of an impending problem.

The method and apparatus disclosed herein can be utilized to provide a number of useful features. For example, as discussed above, stress waves can be monitored and used to detect impending stall in a turbine engine. A Stall Warning System using this device/method can include, for example, one or more stress wave sensors capable of detecting signals at 20 kHz or higher; an electronic assembly (digital or analog); and cabling. The stress wave signal can be amplified, and band pass or high pass filtered to minimize background signals, as discussed above.

An integrator (digital or analog) can be used to determine the Stress Wave Energy (SWE), and the difference in SWE, measured simultaneously at 2 sensor locations (the Delta SWE), can provide an advance indicator of an impending stall. One sensor should be placed "upstream" of the location of interest. The second sensor is placed "downstream" of the location of interest.

The resulting Delta SWE for a combustion turbine engine will decrease as a function of the aerodynamic conditions that precede a stall condition. For non-combustion applications, the opposite might occur, i.e., the SWE may increase when a stall or stall-like event is imminent.

The Delta SWE change can be tested for a threshold level that will indicate an impending stall. The Delta SWE indication of an impending stall can provide enough advance warning to permit corrective action which can prevent the stall.

A further benefit is that the same data that is collected to detect an impending stall can be used, with suitable analysis means, to detect Foreign Object Damage. The same data that is collected to detect an impending stall can be used, with suitable analysis means, to detect bearing and/or gear damage. The same data that is collected to detect an impending stall can be used, with suitable analysis means, to detect lubrication problems. In addition, various feature extraction (FE) techniques identified in the prior art patents cited herein can also be utilized to improve the accuracy of the stall prediction and avoid false alarms.

Furthermore, a benefit of the disclosed process is that the sensors are typically mounted on the external case of the apparatus being monitored, and thus can be non-intrusive. There is no need to provide the sensors within the fluid flow path of the apparatus, as is necessary in some prior art monitoring approaches. This provides the advantage that the sensors can be added to existing applications without any intrusion into the engine being necessary, and the sensor need not be sturdy enough to withstand the various forces and temperatures that are found within the engine/turbine itself. Of course, internal sensors could also be utilized where they are preferable.

The invention has been described hereinabove using specific examples and embodiments; however, it will be understood by those skilled in the art that various alternatives may be used and equivalents may be substituted for elements and/or steps described herein, without deviating from the scope of the invention. Modifications may be necessary to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

What is claimed is:

1. A method for predicting an impending stall event for an apparatus, said method comprising the steps of:
    monitoring a first part of said apparatus to detect a first series of stress waves;
    monitoring a second part of said apparatus to detect a second series of stress waves;
    processing said first series of stress waves to generate a first series of stress wave energy values;
    processing said second series of stress waves to generate a second series of stress wave energy values;
    calculating a difference between said first series of stress wave energy values and said second series of stress wave energy values to generate energy difference values,
    comparing said energy difference values to a threshold value;
    comparing said first series of stress wave energy values to a normal operating value; and
    generating an impending stall signal when both of: said difference values cross said first threshold value and said first series of stress wave energy values are near said normal operating values.

2. The method of claim 1, wherein said apparatus is a turbine engine.

3. The method of claim 1, wherein an impending stall notification is not issued when said first series of stress wave energy values fall outside said normal operating values.

4. The method of claim 1, wherein said impending stall signal is used to generate an impending stall notification to an operator of said apparatus.

5. The method of claim 1, wherein said stress waves have a frequency of greater than 20 kHz.

6. A system for predicting an impending stall event for an apparatus, said system comprising:
- means for monitoring a first part of said apparatus to detect a first series of stress waves;
- means for monitoring a second part of said apparatus to detect a second series of stress waves;
- means for processing said first series of stress waves to generate a first series of stress wave energy values;
- means for processing said second series of stress waves to generate a second series of stress wave energy values;
- means for calculating a difference between said first series of stress wave energy values and said second series of stress wave energy values to generate energy difference values;
- means for comparing said energy difference values to a threshold value;
- means for comparing said first series of stress wave energy values to a normal operating value; and
- means for generating an impending stall signal when both of; said difference values cross said first threshold value, and said first series of stress wave energy values are near said normal operating values.

7. The system of claim 6, wherein said means for monitoring the first part of said apparatus is a first sensor mounted in or on said apparatus at a first location, and wherein said means for monitoring the second part of said apparatus is a second sensor mounted in or on said apparatus at a second location.

8. The system of claim 7, wherein each of said means for processing said first series of stress waves and said means for processing said second series of stress waves includes a filter for filtering noise and a demodulator for detecting amplitude modulations of the stress waves series for generating a first stress wave pulse train and a second stress wave pulse train.

9. The system of claim 8, wherein a CPU is used for generating aid first series of stress wave energy values from said first stress wave pulse train and for generating said second series of stress wave energy values from said second stress wave pulse train.

10. The system of claim 9, wherein said CPU includes said means for comparing said energy difference values to a threshold value and said means for comparing said first series of stress wave energy values to a normal operating value.

11. The system of claim 10, wherein said CPU also includes said means for generating an impending stall signal.

12. The system of claim 10, wherein said CPU is located remotely from said apparatus.

13. A system for predicting an impending stall event for an apparatus, said system comprising:
- a first sensor provided at a first location on said apparatus for monitoring a first series of stress waves for generating a first sensor output signal;
- a second sensor provided at a second location on said apparatus for monitoring a second series of stress waves for generating a second sensor output signal:
- a first electric assembly for receiving said first series of stress waves said first electric assembly including a filter for filtering said first sensor output signal and also including a demodulator for demodulating said first sensor output signal to output a first pulse train:
- a processor adapted for processing said first pulse train into a first series of stress wave energy values, said processor also adapted for processing said second pulse train into a second series of stress wave energy values, wherein said processor utilizes said first series of stress wave energy values and said second series of stress wave energy values to generate derived values for comparing to a threshold value, said processor also adapted for determining whether said first series of stress wave energy values represent a normal operating condition, wherein said processor is adapted to generating an impending stall signal based on results of said comparing and said determining.

14. The system of claim 13, wherein said processor is adapted such that said derived values are based on a difference between said first series of stress wave energy values and said second series of stress wave energy values, and wherein said processor is adapted for generating said impending stall signal; when both said derived values cross said threshold and said determining results in a determination that the operating condition is not abnormal.

15. The system of claim 14, wherein said impending stall signal is used by said system for generating an impending stall notification to an operator of said apparatus.

16. The system of claim 13, wherein said sensors have a resonance response between 20 kKz and 100 kHz.

* * * * *